United States Patent [19]

Antoniadis

[11] Patent Number: 5,033,710
[45] Date of Patent: Jul. 23, 1991

[54] APPARATUS FOR HOLDING AND OPERATING A HAND-HELD TOOL

[76] Inventor: Michael Antoniadis, 1738 Marine Pkwy., Brooklyn, N.Y. 11234

[21] Appl. No.: 533,486

[22] Filed: Jun. 5, 1990

[51] Int. Cl.⁵ ............................................. F16M 3/00
[52] U.S. Cl. .................................. 248/662; 248/188.4; 248/656; 248/664; 248/669
[58] Field of Search ................ 248/662, 664, 666, 667, 248/669, 650, 652, 656, 188.4

[56] References Cited

U.S. PATENT DOCUMENTS

| | | | |
|---|---|---|---|
| 2,389,553 | 11/1945 | Sellars | 248/662 |
| 2,507,900 | 5/1950 | Goetsch | 248/650 |
| 2,568,290 | 9/1951 | Mountain et al. | 248/662 |
| 3,337,214 | 8/1967 | Spiess | 248/662 X |
| 3,353,777 | 11/1967 | Bow | 248/662 |
| 3,417,949 | 12/1968 | Waber | 248/662 X |
| 3,575,368 | 4/1971 | Thomas et al. | 248/669 X |
| 4,044,979 | 8/1977 | Lemmo | 248/662 X |
| 4,352,479 | 10/1982 | Chapman, Jr. | 248/188.4 X |
| 4,576,352 | 3/1986 | Oeden | 248/188.4 |
| 4,771,980 | 9/1988 | Dubbs et al. | 248/662 |

OTHER PUBLICATIONS

The Ridge Tool Company, Ridgid Catalog No. RT-580, pp. 1-5, 84-85 and 112, Feb. 1987.

Primary Examiner—Ramon O. Ramirez
Attorney, Agent, or Firm—Joseph S. Codispoti

[57] ABSTRACT

An apparatus which integrates the remote positioning and operation of hand-held tools. The apparatus has a base and an elongated tube which is connected to the base at one of its ends via a pivot. The tube has a spirally grooved interior surface. The other end of the tube is adaptively engaged to a threaded elongated cylinder of similar manufacture to the tube. The cylinder can be screwed or rotated in and out of the tube by the use of a screw turn. While one end of the cylinder is engaged to the tube, the other end is connected to a seat that holds the tool. The tool is held in place on the seat either by seat design or by use of a clamp. The seat-cylinder connection may be modular to permit the seat to be changed as required. The operation of the tool, the pivot and the screw turn are controlled by a power control panel located either on the base or the tube of the apparatus. The apparatus thus permits a worker to operate the tool and position the tool, via the movements of the pivot-tube action and the cylinder-tube action, while the tool is at a remote distance.

41 Claims, 2 Drawing Sheets

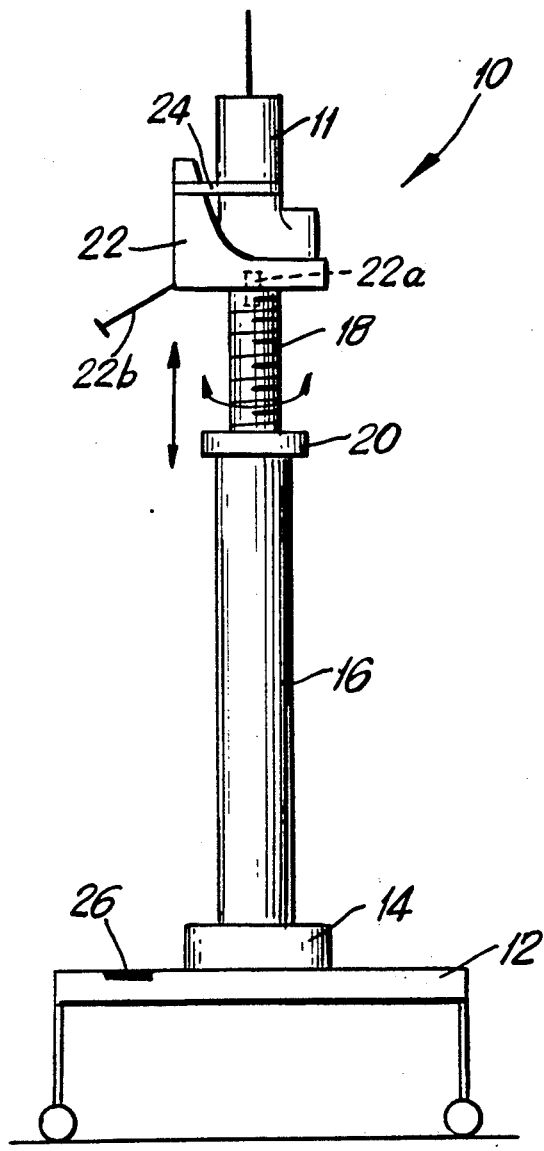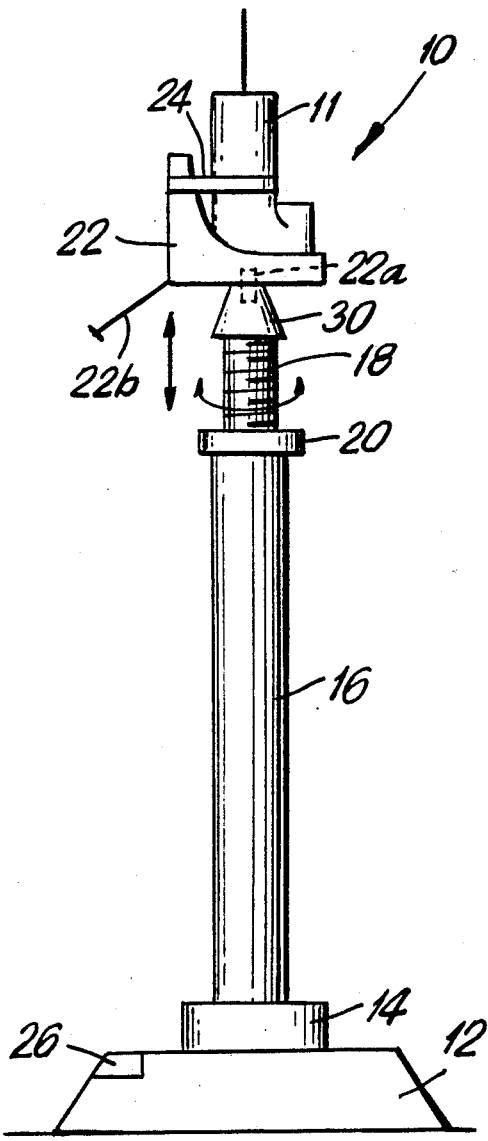

APPARATUS FOR HOLDING AND OPERATING A HAND-HELD TOOL

TECHNICAL FIELD

This invention relates to an adjustable apparatus for holding and operating a hand-held tool. More particularly, this invention relates to an apparatus which integrates the remote positioning and operation of a hand-held construction tool.

BACKGROUND OF THE INVENTION

One of the biggest problems that a building construction contractor or worker faces is an "in-the-air" task (i.e., a task that must be done above the height of an ordinary worker, usually at or above the ceiling height). "In-the-air" tasks include, for example, the installation or rearrangement of plumbing piping, air-conditioning ducts, fire sprinkler piping, electrical lighting fixtures, and acoustical ceiling tile. The performance of such tasks can require the use of specialized hand-held tools, for example, to drill into the ceiling slab to insert hangers, to cut a portion of piping or to affix sections of duct together by screw or otherwise. The usual method to overcome the obstacle of height is to raise the level of the worker, for example, by using a ladder, or in certain situations, constructing a scaffold. A ladder is normally used when a single worker can complete a task; a scaffold is usually used when large areas are under construction or renovation or when several workers need to be above the ground to perform a task or tasks. The ladder and the scaffold each perform the function of providing a temporary platform for a worker to sit or stand on when working above the ground level.

However, both ladders and scaffolding have limitations and drawbacks in providing such a platform. As mentioned above, a ladder is restricted to one area and can hold only one worker at a time. Second, even the best-equipped worker cannot compensate for the lost time of travelling up and down a ladder, for example, to retrieve supplies, to move the ladder to another location or position, or to broadly inspect the work just completed. Such lost time translates into additional expense for the contractor and the contractee. Third, construction labor union contracts usually specify that additional manpower is required to hold a ladder in place while a worker is using it, thereby driving up the cost of utilizing a ladder even for the simplest of tasks. Fourth, it is cumbersome and, more importantly, hazardous to work with hand-held tools on a ladder because of the limited stability of a ladder.

Scaffolding overcomes only some of the limitations of a ladder, by providing a larger platform area for more than one worker and by providing greater stability when working with certain hand-held tools. However, certain other hand-held tools, such as drills, generate a great amount of torque or force and thus can create a certain degree of instability even when a worker using such a tool is stationed on the ground. Second, positioning a scaffold is more cumbersome than positioning a ladder so that certain ceiling areas cannot be reached without consuming time and, at times, without resorting to a ladder or other means of support. Third, scaffolding is expensive and time-consuming to construct and to dissemble. Fourth, both a scaffold and a ladder raise the level of a worker to the elevated work zone. Disadvantageously, however, this may not be desired if the operation of the tool causes dust, metal fragmentation and the like, or the work zone is inherently hazardous, such as asbestos-lined ceilings. Thus, neither device can shield a worker who is already in a vulnerable position by being off the ground.

SUMMARY OF THE INVENTION

Briefly, the invention provides an apparatus for remotely positioning and operating a hand-held construction tool. The apparatus comprises means for supporting the tool a certain distance from the floor level; means for changing the distance of the tool from the floor level; means for changing the angular position of the tool relative to the plane or the floor level; and means for controlling the operation of the tool. The means for changing the distance and the means for changing the angular position are operably connected to the means for supporting the tool.

The means for remotely controlling can include means for remotely controlling the operation of the means for changing the distance and the means for changing the angular position. Further, the apparatus can include means for permitting the rotation of the tool during operation or means for rotating the tool, both means being operably connected to the means for supporting the tool. Further, the apparatus can provide means for providing locomotion to the apparatus; means for supplying power to the tool; or a computer-driven control element for the means for remotely controlling. The apparatus can also include an additional element of means for urging the tool forward along the axis of operation of the tool.

Advantageously, the apparatus provides for the remote positioning and operation of a hand-held tool without a loss in efficiency and increase in cost. In fact, productivity can be increased with the invention by enabling remote tasks to be performed quickly and without the need for cumbersome repositioning of people and materials. Moreover, the invention allows such tasks to be performed without a compromise in safety since a worker can be positioned on a stable platform while using a tool and, further, can be positioned away from the work zone which may be relatively hazardous.

BRIEF DESCRIPTION OF THE DRAWINGS

For a better understanding of the invention, reference is made to the following description of an exemplary embodiment thereof, and to the accompanying drawings, wherein:

FIG. 2 is a schematic representation of a side view of a second embodiment of an apparatus for holding and operating a hand-held tool of the present invention; and, FIG. 3 is a schematic representation of a side view of a third embodiment of an apparatus for holding and operating a hand-held tool of the present invention.

DETAILED DESCRIPTION

Figure 1:
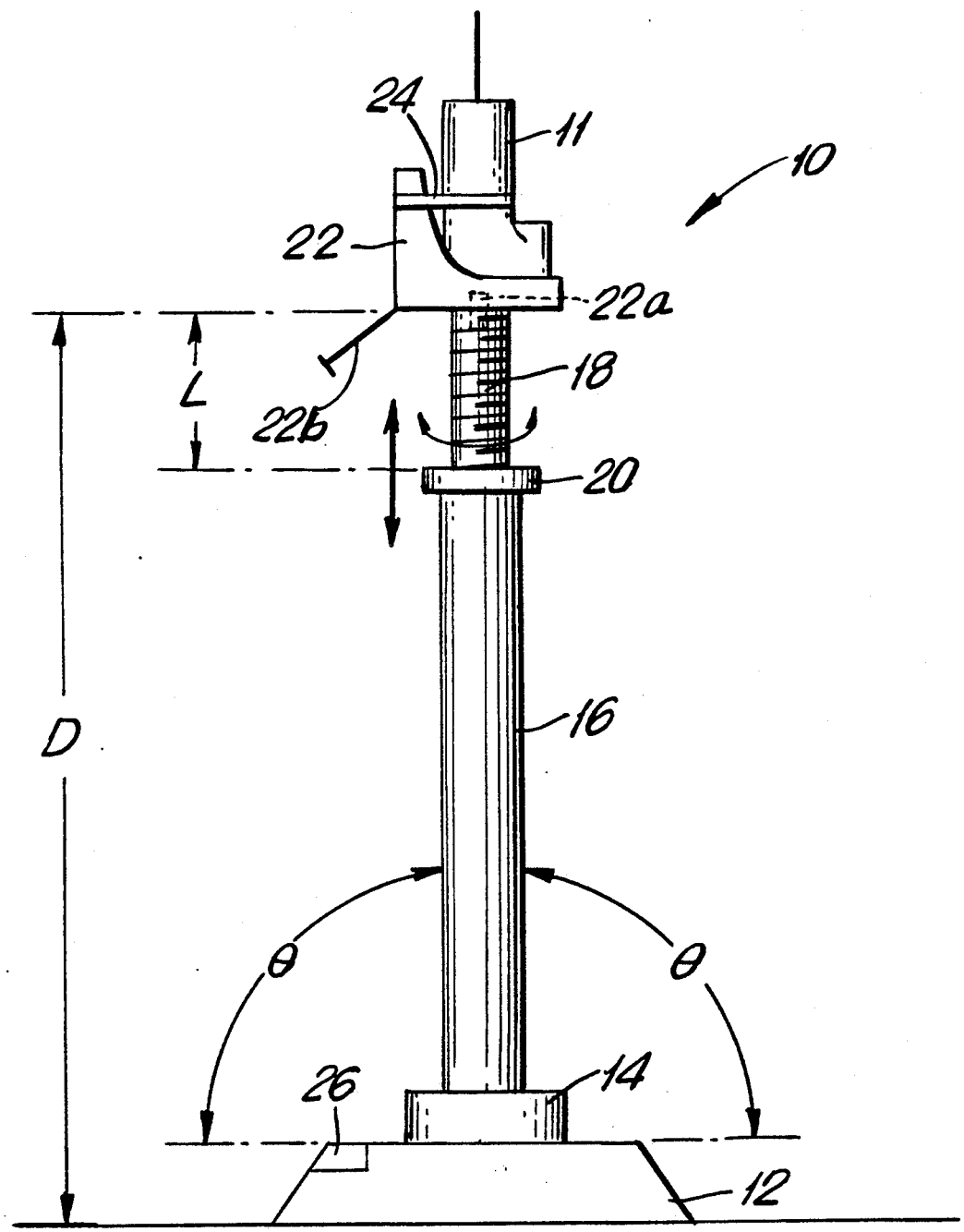
FIG. 1 is a schematic representation of a side view of an apparatus for holding and operating a hand-held tool of the present invention.

FIG. 1 is a schematic representation of a side view of an apparatus 10 for holding and operating a hand-held tool 11 of the present invention. The apparatus 10 comprises a base 12 which is connected at the top surface via a pivot 14 to a first end of a hollow elongated cylinder or tube 16. The base 12 can be of any material, configuration or size, but it must be able to maintain the apparatus 10 stable, during operation, on the floor or platform that it is situated on and yet permit the apparatus 10 to be moved when required. As shown in FIG. 2, the base 12 can be in the configuration and size of a scaffold, which can be used to support workers a certain height above the floor. As also shown, the base 12 can incorporate a mechanism to provide locomotion, such as lockable wheels 12a or the like, yet maintain stability when the apparatus 10 is in operation.

The pivot 14 is situated on the top surface of the base 12 and may be constructed so as to be integral with the base 12. The pivot 14 enables the tube 16 to be moved through a range of angles b from 0 to 90 degrees with respect to the plane of the pivot 14 parallel to the floor level. The pivot 14 can be achieved by any method, such as through the use of a shaft, pin, ball, ratchet, etc., and can be driven by any means, such as by motor, manually, electronically, etc. Further, the pivot 14 includes a mechanism to securely lock the position of the tube 16 regardless of its angular position.

The tube 16 is constructed to have a spirally grooved hollow interior. The tube 16 can be of any desired length and can be manufactured from any type of material sufficient to support the weight and withstand the force of a tool 11 that may be utilized with the apparatus 10. The second end of the tube 16 is operably connected to a threaded elongated cylinder 18 of similar manufacture. The threaded cylinder 18 has a projecting helical rib by which a first end of the cylinder 18 can be rotated or screwed in and out of the grooved hollow interior at the second end of the tube 16. The length L of the cylinder 18 that can be screwed in and out of or engaged to the tube 16 is a function of the lengths of each as well as the ability of both the cylinder 18 and the tube 16 to support the apparatus 10 stably during operation. The cylinder 18 can be screwed in and out of the tube 16 via a screw turn 20 which may be implemented and driven by any of a variety of means, for example, mechanical, electronic, or pneumatic. The screw turn 20 includes a mechanism to securely lock the cylinder 18 at the position and length L it is engaged with the tube 16.

The cylinder 18 is connected at the second end to a seat 22 which firmly holds the tool 11 therein. The type of connection between the cylinder 18 and the seat 22 depends on the application for the apparatus 10. For example, the cylinder 18 and the seat 22 can be integrally formed as one element. Alternatively, the seat 22 can be connected to the cylinder 18 via a pin, screw or other rotation element 22a so that the seat 22 can rotate independently of the cylinder 18 rotation. This type of connection increases the stability and safety of the apparatus 10 by preventing any force or torque generated by the tool during operation from being transferred to the rest of the apparatus 10. Instead, any force or torque so generated causes the seat 22 and the tool 11 to rotate harmlessly without effect to either a worker or bystanders. The rotation element 22a may be lockable to the extent of holding the seat 22 from rotating until a predetermined amount of torque is exceeded. The seat 22 may also include a handle 22b to steer the seat 22 and control the seat's rotation during operation. The rotation element 22a and the handle 22b may be integral with the cylinder 18 and the seat 22, respectively. The connection, regardless of type, can be of modular design so that the seat 22 and the cylinder 18 ca be lockably connected to one another permitting replacement of the seat 22 by different seat to fit a specific tool 11.

The seat 22 is configured so as not to interfere with the axis of operation of a tool 11. The axis of operation varies from tool to tool and task to task; for example, the axis of operation for a drill positioned for overhead tasks is coincident with the axis of the tube 16; but, for a drill positioned for side wall tasks, the axis of operation is perpendicular to the axis of the tube 16. The seat 22 can be of any material, configuration or size, for example, an adjustable angle bracket having fastening straps to securely hold the tool 11 to the bracket or a molded material shaped to firmly hold a specific tool 11. Further, the seat 22 can include material to dampen any vibrations generated by the tool 11, and thereby increase the stability of the apparatus 1 during operation. Regardless of design, a clamp 24 may also be used in conjunction with the seat 22. The clamp 24 may be any binding device that will hold the tool 11 firmly to the seat 22, for example, Velcro TM straps, and may be constructed to be integral with the seat 22 or to be a separate element.

The apparatus 10 also includes a power/control panel 26 from which the tool 11 can be remotely operated. The panel 26 can be located on the base 12 (and thus amenable to foot control by a worker) or along the tube 16 (amenable to manual control). The panel 26 is connected to the tool 11 via power and control circuitry within the apparatus 10 and connectable to the tool 11 within the seat 22. The panel 26 may also control the positioning operations of the pivot 14 and the screw turn 20 when those elements are amenable to remote control. Further, the panel 26 can also operate the locomotion of the apparatus 10 if the apparatus 10 is so configured (for example, as shown in FIG. 2). If desired, the panel 26 can be computer-based and thus capable of operating the apparatus 10 automatically with or without the attendance of a worker. Note that in certain circumstances and in conjunction with the use of the power/control panel 26, the apparatus 10 also may be constructed to incorporate a power source (not shown) for the tool 11. The power source may be achieved by any means sufficient to drive the particular tool 11 utilized by the apparatus 10.

In operation, a tool 11 is placed into the seat 22 and firmly held thereto by the operation of the clamp 24 or otherwise. At this time, the length L of the cylinder 18 engaged to the tube 16 is of a length sufficient to permit the tool 11 to be easily placed in the seat 22 by a worker. The apparatus 10 is then moved, either physically or via the locomotion means of the apparatus 10, to the location where the "in-the-air" task is to be performed. Note that the apparatus 10 can be used on a scaffold and any other platform or floor as well as on the ground. Note also that the apparatus 10 need not be precisely aligned with the "in-the-air" work zone since the tube 16 (and thus the plane of operation of the tool 11) can be maneuvered through a range of angular positions $\theta$ to reach a particular area. Once at the desired location, the screw turn 20 is then manipulated to rotate or screw the cylinder 18 out of the tube 16 interior moving the tool 11 a certain distance D from the floor to the desired work zone. The pivot 14 is then operated to adjust the angular position $\theta$ of the tube 16 to precisely place the tool 11 in the work zone. Both the cylinder 18 and the pivot 14 are locked into position before the tool 11 is put into operation. Once the tool 11 is locked in position, the tool 11 is remotely started and operated from the power/control panel 26. The position of the tool 11 (i.e., the angular position $\theta$ and the distance D from the floor) can be moved from its locked position during its operation if desired and according to the task undertaken. The tool 11 can be further maneuvered during operation by use of the handle 22a of the seat 22. A worker may or may not be required to attend the movement and/or operation of the apparatus 10 depending on the sophistication of the control implemented with the apparatus 10. Once the task is completed, the apparatus 10 can be moved to the next location for the next task.

FIG. 3 is a schematic representation of a third embodiment of an apparatus 10 for holding and operating a hand-held tool 11 of the present invention. As shown, the cylinder 18 is connected at the second end to a mechanism 30 that exerts pressure to the seat 22 and is capable of moving the seat 22 for a certain distance. The pressure mechanism 30 can be integrally connected to either or both the cylinder 18 and the seat 22. Further, if desired, the pressure mechanism 30 may be connected to the seat 22 via the rotating element 22a. The pressure mechanism 30 can be used in conjunction with the cylinder 18 for extending the distance D the tool 11 can be moved or in situations where the cylinder 18 is not required. In addition, the pressure mechanism 30 can be used to push or press the seat 22 and the tool 11 forward in the direction of the plane of operation. Thus, a tool 11, such as a drill, which can utilize such forward force for more efficient operation can use not only the incremental force provided by the movement of the cylinder 18 but can call on the pressure mechanism 30 to supply an additional amount of force upon demand. The pressure mechanism 30 may be controlled manually or from the power/control panel 26.

The embodiments described herein are merely illustrative of the principles of the present invention. Various modifications may be made thereto by persons ordinarily skilled in the art, without departing from the scope or spirit of the invention. For example, the apparatus 10 can be configured so that the tool 11 is constructed to be integral with the cylinder 18 so that the seat 22 is unnecessary. Further, the apparatus 10 can be configured so that the handle 22b is replaced by an automatic stabilizing element or one that is controlled by the power/control panel 26. Further, the tube 16 and the cylinder 18 screw operation can be replaced by any other movement mechanism (for example, a pneumatic system) to affect the tool 11 positioning. Further, the apparatus 10 may be operably linked to a control (other than the power/control panel 26) located at a site away from the apparatus 10, so that the attendance of a worker may not be required at all (such as during the removal of asbestos and the like).

What is claimed is:

1. An apparatus for positioning and operating a hand-held tool, comprising:
   a) means for supporting the tool a certain distance from the floor level;
   b) means for changing the distance of the tool from the floor level;
   c) means for changing the angular position of the tool relative to the floor level, said means for changing the distance and means for changing the angular position being operably connected to the means for supporting; and
   d) means for remotely controlling the operation of the tool.

2. The apparatus of claim 1 wherein the means for remotely controlling further comprises means for remotely controlling the operation of the means for changing the distance and the means for changing the angular position.

3. The apparatus of claim 1 further comprising means for permitting rotation of the tool during operation, said means being operably connected to the means for supporting.

4. The apparatus of claim 1 further comprising means for rotating the tool, said means being operably connected to the means for supporting.

5. The apparatus of claim 3 wherein the means for remotely controlling further comprises means for remotely controlling the operation of the means for changing the distance, the means for changing the angular position, and the means for permitting the rotation.

6. The apparatus of claim 1 further comprising means for providing locomotion to the apparatus.

7. The apparatus of claim 6 wherein the means for remotely controlling further comprises means for remotely controlling the operation of the means for providing locomotion to the apparatus.

8. The apparatus of claim 1 further comprising means for supplying power to the tool.

9. The apparatus of claim 1 wherein the means for remotely controlling comprises a computer-driven control element.

10. The apparatus of claim 1 further comprising means for urging the tool forward along the axis of operation of the tool.

11. The apparatus of claim 10 wherein the means for remotely controlling further comprises means for remotely controlling the operation of the means for urging the tool forward.

12. An apparatus for positioning and operating a hand-held construction tool, comprising:
   a) means for holding the tool;
   b) a base;
   c) means for positioning the means for holding the tool relative to the base;
   d) means for permitting rotation of the means for holding the tool during operation; and
   e) means for remotely controlling the operation of the tool.

13. The apparatus of claim 12 wherein the means for holding the tool comprises a seat which is configured to firmly hold the tool in place therein during operation.

14. The apparatus of claim 12 wherein the means for holding the tool comprises a seat for holding the tool and means for holding the tool firmly within the seat.

15. The apparatus of claim 12 wherein the means for holding the tool further comprises means for dampening any vibration generated by the tool during operation.

16. The apparatus of claim 12 wherein the means for holding the tool further comprises means for dampening any noise generated by the tool during operation.

17. The apparatus of claim 12 wherein the means for positioning comprises:
   a) means for changing the distance between the means for holding the tool and the base; and
   b) means for changing the angular position of the means for holding the tool relative to the base.

18. The apparatus of claim 12 wherein the means for positioning comprises a pair of telescoping tubes, one end of one of the tubes being connected to the base and one end of the other tube being connected to the means for holding the tool so as to enable the distance between the means for holding the tool and the base to be changeable.

19. The apparatus of claim 12 wherein the means for positioning comprises an elongated screw connected at one end to the base and at the other end to the means for holding the tool so as to enable the distance between the means for holding the tool and the base to be changeable.

20. The apparatus of claim 12 wherein the means for positioning comprises a pair of telescoping tubes, one end of the tubes being connected pivotally to the base so as to enable the angular position of the means for holding the tool relative to the base to be changeable and one end of the other tube being connected to the means for holding the tool so as to enable the distance between the means for holding the tool and the base to be changeable.

21. The apparatus of claim 12 wherein the means for positioning comprises an elongated screw connected at one end pivotally to the base so as to enable the angular position of the means for holding the tool relative to the base to be changeable and at the other end to the means for holding the tool so as to enable the distance between the means for holding the tool and the base to be changeable.

22. The apparatus of claim 12 wherein the means for permitting rotation further comprises means for permitting rotation of the means for holding upon the generation of a predetermined amount of torque by the tool during operation.

23. The apparatus of claim 12 further comprising means for controlling the means for permitting rotation of the means for holding.

24. The apparatus of claim 12 further comprising means for providing locomotion to the apparatus.

25. The apparatus of claim 12 further comprising means for supplying power to the tool.

26. The apparatus of claim 12 wherein the means for remotely controlling comprises a computer-driven control element.

27. The apparatus of claim 12 further comprising means for urging the means for holding the tool forward along the axis of operation of the tool.

28. An apparatus for positioning and operating a hand-held construction tool, comprising:
a) a base;
b) an elongated cylindrical tube which has a spirally grooved interior surface and which is at a first end pivotally and lockably connected to the base so as to enable the tube's angular position to be varied relative to the plane of the base parallel to the floor;
c) a threaded elongated cylinder having a first end which is adaptively engageable with the interior of the second end of the tube and a second end which is connected to the tool;
d) means for moving the cylinder in and out of the second end of the tube; and
e) means for controlling the operation of the tool.

29. The apparatus of claim 28 wherein the base is a scaffold.

30. The apparatus of claim 28 wherein the base further comprises means for providing locomotion to the apparatus.

31. The apparatus of claim 30 wherein the means for providing locomotion comprises a lockable wheel assembly.

32. The apparatus of claim 28 further comprising a power source for the tool.

33. The apparatus of claim 28 further comprising a seat to firmly hold the tool in place therein which is connected to the second end of the elongated cylinder in a manner to permit rotation of the seat and the tool during operation.

34. The apparatus of claim 28 further comprising:
a) a seat to firmly hold the tool in place therein which is connected to the second end of the elongated cylinder in a manner to permit rotation of the seat and the tool during operation; and
b) means for controlling the rotation of the seat and the tool.

35. The apparatus of claim 33 wherein the seat further comprises means for dampening any vibration generated by the tool during operation.

36. The apparatus of claim 33 wherein the seat further comprises a clamp to hold the tool firmly to the seat.

37. The apparatus of claim 33 wherein the seat further comprises a binding strap to hold the tool firmly to the seat.

38. The apparatus of claim 28 wherein the means for controlling comprises a computer-driven control element.

39. The apparatus of claim 28 further comprising means for urging the tool forward along the axis of operation of the tool.

40. The apparatus of claim 33 further comprising means for urging the seat and the tool forward along the axis of operation of the tool.

41. The apparatus of claim 34 further comprising a jack connected at one end to the elongated cylinder and at the other end to the seat, in a manner to permit rotation of the seat and the tool during operation, which enables the seat and the tool to be urged forward along the axis of operation of the tool.

* * * * *